(12) United States Patent
Harper et al.

(10) Patent No.: US 6,338,462 B1
(45) Date of Patent: Jan. 15, 2002

(54) TENSIONING CLIP AND HIGH VOLTAGE WIRE HOLDER

(75) Inventors: Shawn Harper, Sacramento; Andy Olin Souders, Carlsbad; Rafael Calderon, San Diego, all of CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/353,398

(22) Filed: Jul. 15, 1999

(51) Int. Cl.[7] ................................................ A47H 1/16
(52) U.S. Cl. ..................................... 248/302; 248/249
(58) Field of Search ............................... 248/302, 200, 248/41.8, 48.2, 112, 249; 361/150

(56) References Cited

U.S. PATENT DOCUMENTS

| | | | | |
|---|---|---|---|---|
| 3,749,346 A | * | 7/1973 | Cherniak | 248/302 |
| 3,802,572 A | * | 4/1974 | Shackel | 248/302 |
| 4,700,260 A | * | 10/1987 | Craig et al. | 361/150 |
| 5,038,078 A | * | 8/1991 | Duggan | 361/150 |
| 5,416,595 A | * | 5/1995 | Wield | 361/150 |
| 5,458,309 A | * | 10/1995 | Craven, Jr. et al. | 248/302 |
| 5,577,699 A | * | 11/1996 | Gardner et al. | 248/302 |

* cited by examiner

*Primary Examiner*—Leslie A. Braun
*Assistant Examiner*—Naschica S. Morrison
(74) *Attorney, Agent, or Firm*—Rader, Fishman & Grauer PLLC; Ronald P. Kananen, Esq.

(57) ABSTRACT

A tensioning clip and high voltage wire holder is disclosed, which includes a body portion, hooked portions which extend out from the body portion, each for grasping a degaussing cable, and maintaining it against a cathode ray tube, and a clip, disposed opposite the hooked portions, and connected to the body portion, that maintains a high voltage cable away from the cathode ray tube.

4 Claims, 2 Drawing Sheets

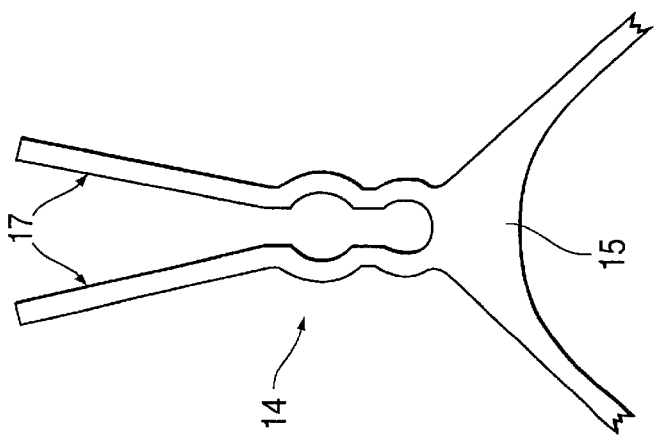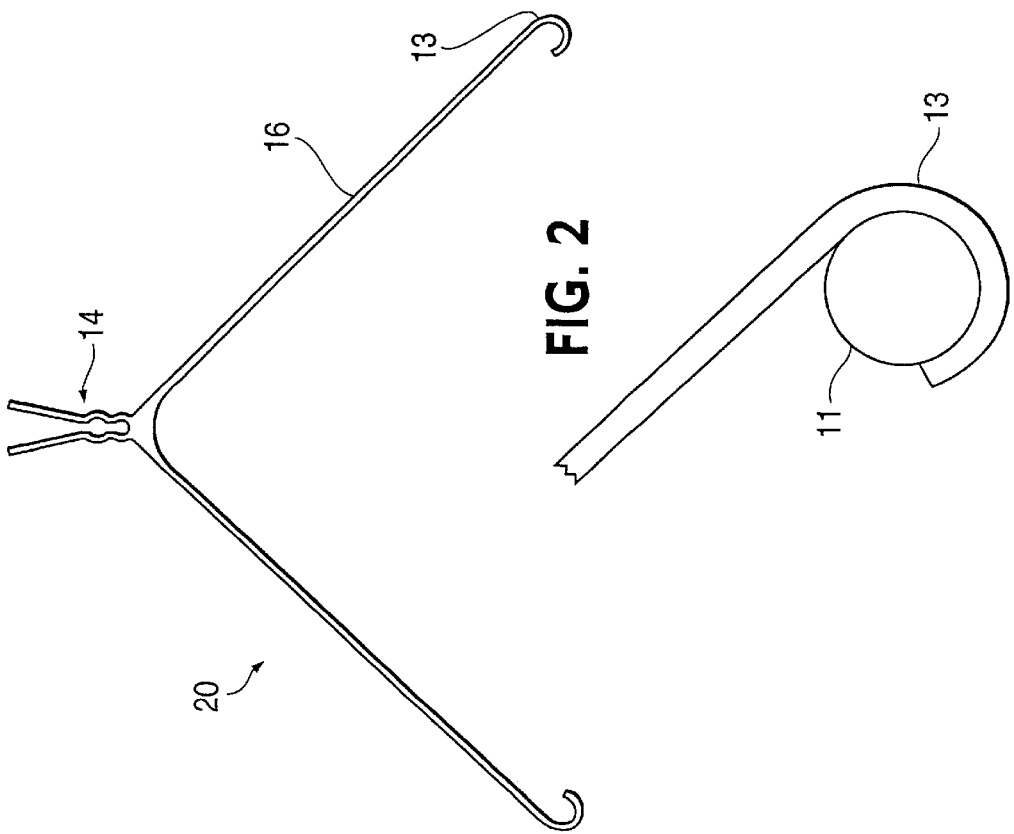

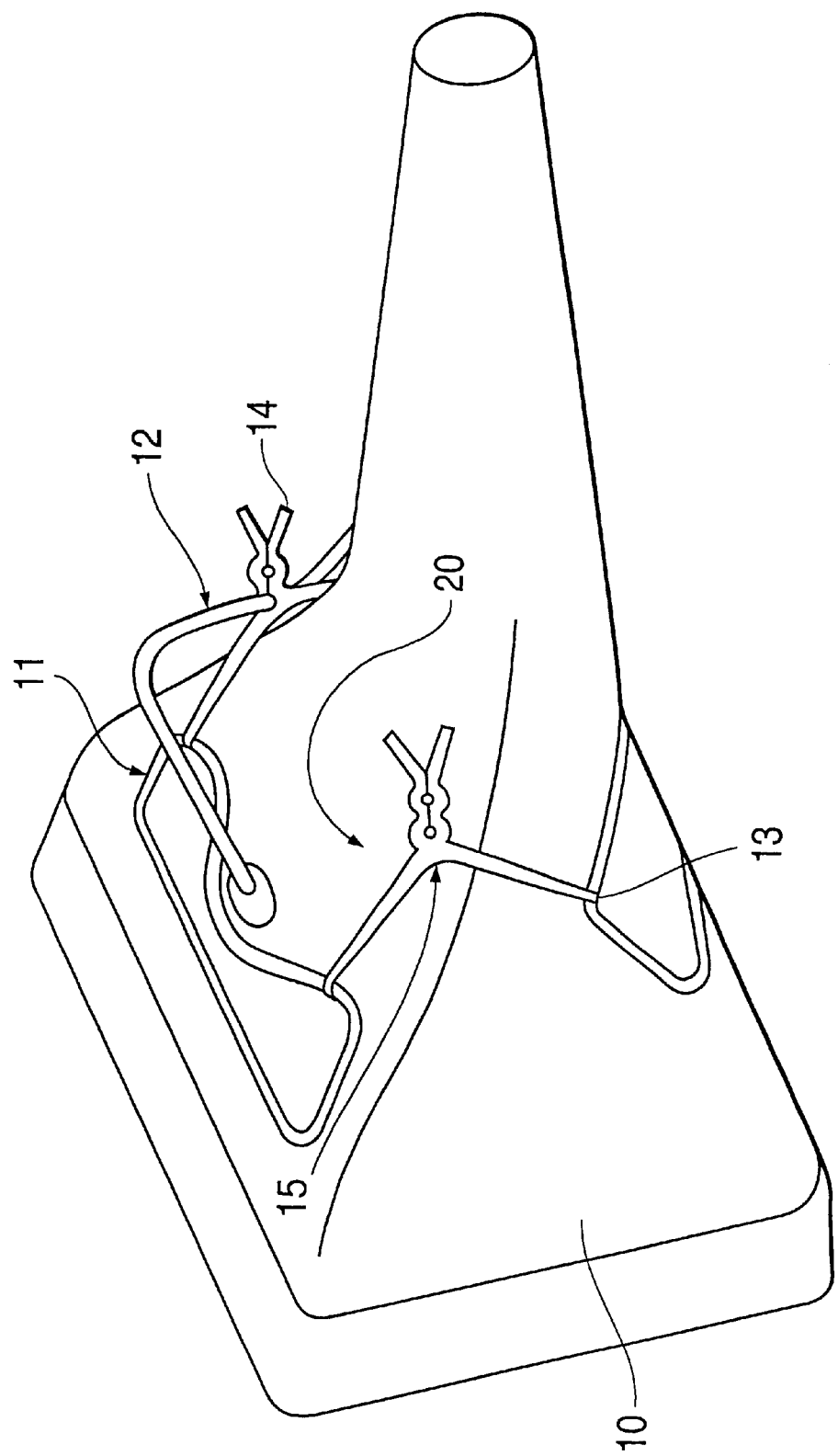

TENSIONING CLIP AND HIGH VOLTAGE WIRE HOLDER

FIELD OF THE INVENTION

The present invention relates to the field of cathode ray tube manufacture. Specifically, the present invention relates to the field of attaching high voltage wires such as auto-degauss cables to cathode ray tubes during manufacture.

BACKGROUND OF THE INVENTION

This invention is directed to clips for high voltage wires, such as an auto-degauss cable (DGC), that are connected to a cathode ray tube (CRT). In the past, DGCs have been fastened to a shield of the CRT. CRTs are used in, for example, computer monitors and televisions. The DGC has been attached to the CRT shield through the use of four identical clips mounted to the shield.

However, in order to make manufacture of such monitors and their components less expensive, the CRT shield has been omitted in more recent monitor designs. Therefore a need exists in the art for a means and method of properly attaching a DGC to a CRT when no CRT shield is present.

SUMMARY OF THE INVENTION

Accordingly, it is an object of the present invention to provide a manner of attaching a DGC and other high voltage wires to a monitor in the absence of a CRT shield. Furthermore, in light of the aims of reducing the cost of manufacturing CRT monitors, it is an object of the invention to provide a manner of attaching a DGC to a monitor while reducing the number of required parts used to do so as compared with previous attachment devices. Finally, it is a further object of the invention to fasten DGC wire coils on monitors without CRT shields while maintaining the high voltage coils at the required distance away from the CRT to avoid any likelihood that the DGC might damage the CRT.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a tensioning clip and high voltage wire holder that includes a body portion, hooked portions which extend out from the body portion each for grasping a degaussing cable and maintaining it against a cathode ray tube, and a clip connected to the body portion that maintains the high voltage cable away from the cathode ray tube. The clip is disposed opposite the hooked portions, relative to the body portion.

The tensioning clip and high voltage wire holder may also include ears extending from the clip, further away from the body than the clip. The body portion may also include an arcuate portion which provides a tension force that biases the hooked portions toward each other.

BRIEF DESCRIPTION OF THE DRAWINGS

The accompanying drawings illustrate the present invention and are a part of the specification. Together with the following description, the drawings demonstrate and explain the principles of the present invention.

FIG. 1 shows a top view of the tensioning clip and high voltage wire holder of the present invention.

FIG. 2 shows a close-up top view of the high voltage wire holder portion of the present invention.

FIG. 3 shows a close-up top view of the tensioning clip portion of the present invention.

FIG. 4 shows the tensioning clip and high voltage wire holder of the present invention, as used when attached to a DGC and a high voltage wire.

DESCRIPTION OF THE PREFERRED EMBODIMENT

The above objects and others are accomplished by the tensioning clip and high voltage wire holder 20 as shown in FIG. 1. The tensioning clip and high voltage wire holder 20 has two identical curved ends which serve as hooks 13, as shown in FIG. 2, to firmly grasp the inner edges of the DGC coil 11. FIG. 4 shows the hooks 13, each connected to a DGC.

The DGC coils 11 pull the hooks 13 away from each other. However, the arcuate body portion 15 of the tensioning clip and high voltage wire holder 20, from which the extension portions 16 reach, provides tension in the extension portions 16, which biases the hook portions 13 toward each other. The shape of the tensioning clip and high voltage wire holder 20, with the arcuate body 15 and the extension portions 16, ensure that the DGC coils are fastened tightly and securely against the surface of the CRT 10.

Extending from the top of the body 15 is a clip 14 which fastens a high voltage cable 12 in any of a number of set positions. The high voltage cable extends from the CRT 10. It is imperative that the high voltage cable 12, which connects the monitor flyback transformer to the CRT 10, be maintained at a certain distance away from the CRT 10 and the clip 14 accomplishes this purpose.

It is particularly important that the high voltage cable 12 and the CRT 10 do not touch. Accordingly, the high voltage cable 12 fits between the ears 17 of the high voltage wire holder 20 and is held in the clip 14 by a snap-in type of action. Because the ears 17 reach a significant distance from the body 15, and away from the clip 14, if the high voltage cable does for some reason escape from the clip 14, it will still be held away from the CRT 10 between the ears 17.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of securing auto degauss cables and high voltage wires to cathode ray tubes, comprising:

securing a clip between auto degauss cabling on upper and lower portions of a cathode ray tube so as to secure said auto degauss cabling to said cathode ray tube, wherein said clip comprises:
an arcuate body portion,
two hooked portions, extending out from said arcuate body portion, each for grasping a degaussing cable and maintaining said degaussing cable against a cathode ray tube; and a holder, connected to said body portion, for maintaining a high voltage cable away from said cathode ray tube.

2. The method of claim 1, wherein said securing comprises securing two clips between said auto degauss cabling, said two clips being on opposite sides of said cathode ray tube.

3. The method of claim 1, further comprising securing a high voltage cable in a holder provided on one of said clips, wherein said holder holds said high voltage cable away from said cathode ray tube.

4. The method of claim comprising disposing said holder on said clip so as to extend away from said portions of said clip which engage said auto degauss cabling.

* * * * *